March 22, 1932.  W. E. BUNDY  1,850,918

INCUBATOR

Filed Aug. 10, 1927  3 Sheets-Sheet 1

INVENTOR
WHITNEY E. BUNDY,
BY
Toulmin & Toulmin
Attorneys

March 22, 1932. W. E. BUNDY 1,850,918
INCUBATOR
Filed Aug. 10, 1927 3 Sheets-Sheet 3

Inventor
WHITNEY E. BUNDY,
BY
Toulmin & Toulmin
Attorneys

Patented Mar. 22, 1932

1,850,918

UNITED STATES PATENT OFFICE

WHITNEY E. BUNDY, OF DONNELLSVILLE, OHIO

INCUBATOR

Application filed August 10, 1927. Serial No. 211,905.

My invention relates to incubators.

It is the object of my invention to provide an incubator of the open cabinet type in which there are means for stirring the air and for driving the air in stirred condition in opposite directions from intermediate heating means.

It is a further object to drive a portion of the air over moisture means and to then deliver the moisture laden air in mixed condition in the place where eggs of advanced stages of incubation are located, thereby providing greater moisture in one portion of the cabinet than in another, the eggs in advanced stages of incubation needing considerable moisture while those in the earlier stages need very little moisture. Hence it is my object to provide means of supplying the groups of eggs needing the most moisture and of localizing the moisture laden air.

It is a further object of my invention to provide means of adjusting the position of the stirrers so as to regulate the distance of one group of stirrers from the others, the distance of the stirrers from the heating elements and the distance of the stirrers from the moisture elements.

Referring to the drawings.

Figure 1:
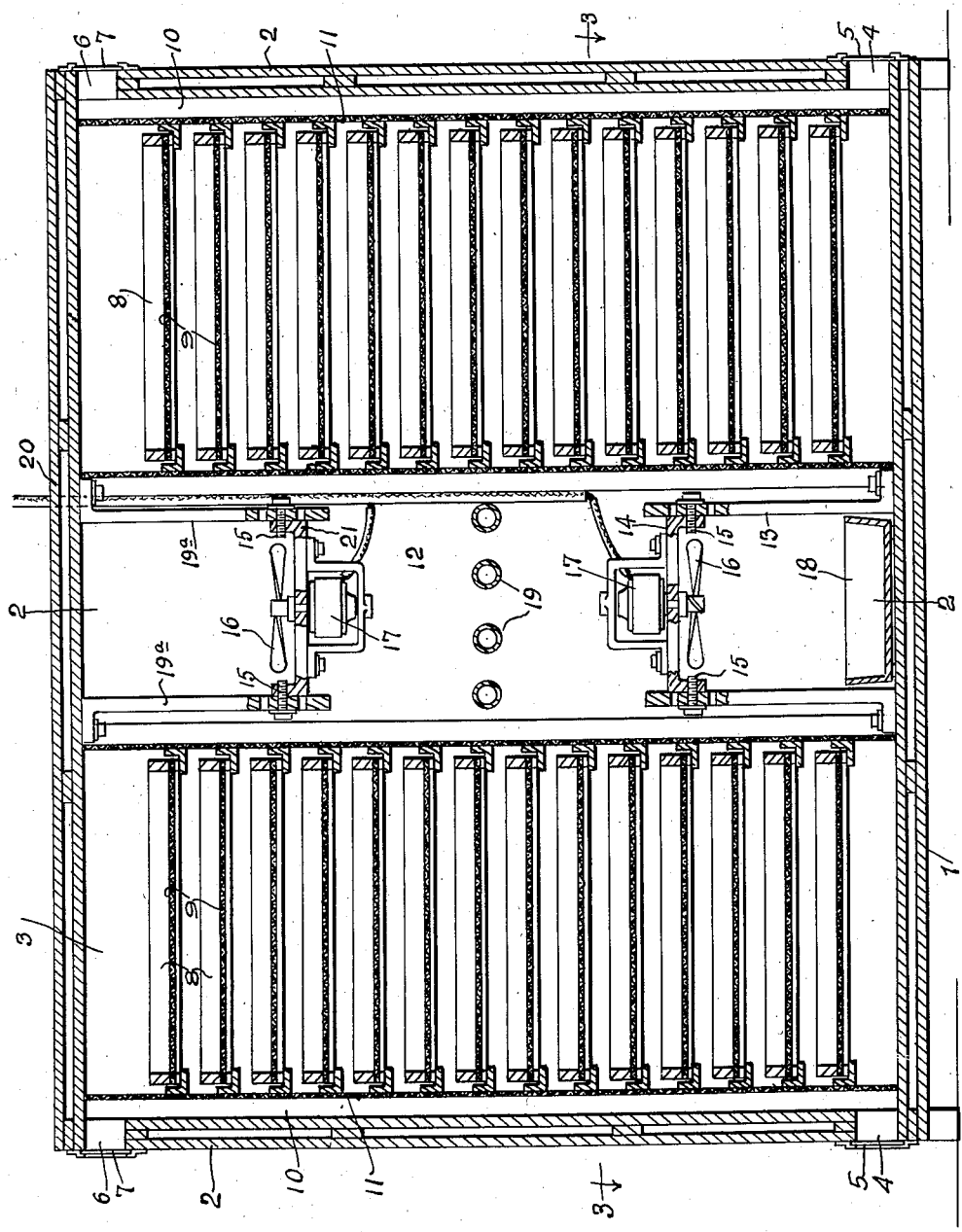
Figure 1 is a front elevation with the doors removed showing the interior arrangement of the cabinet.
Figure 2:
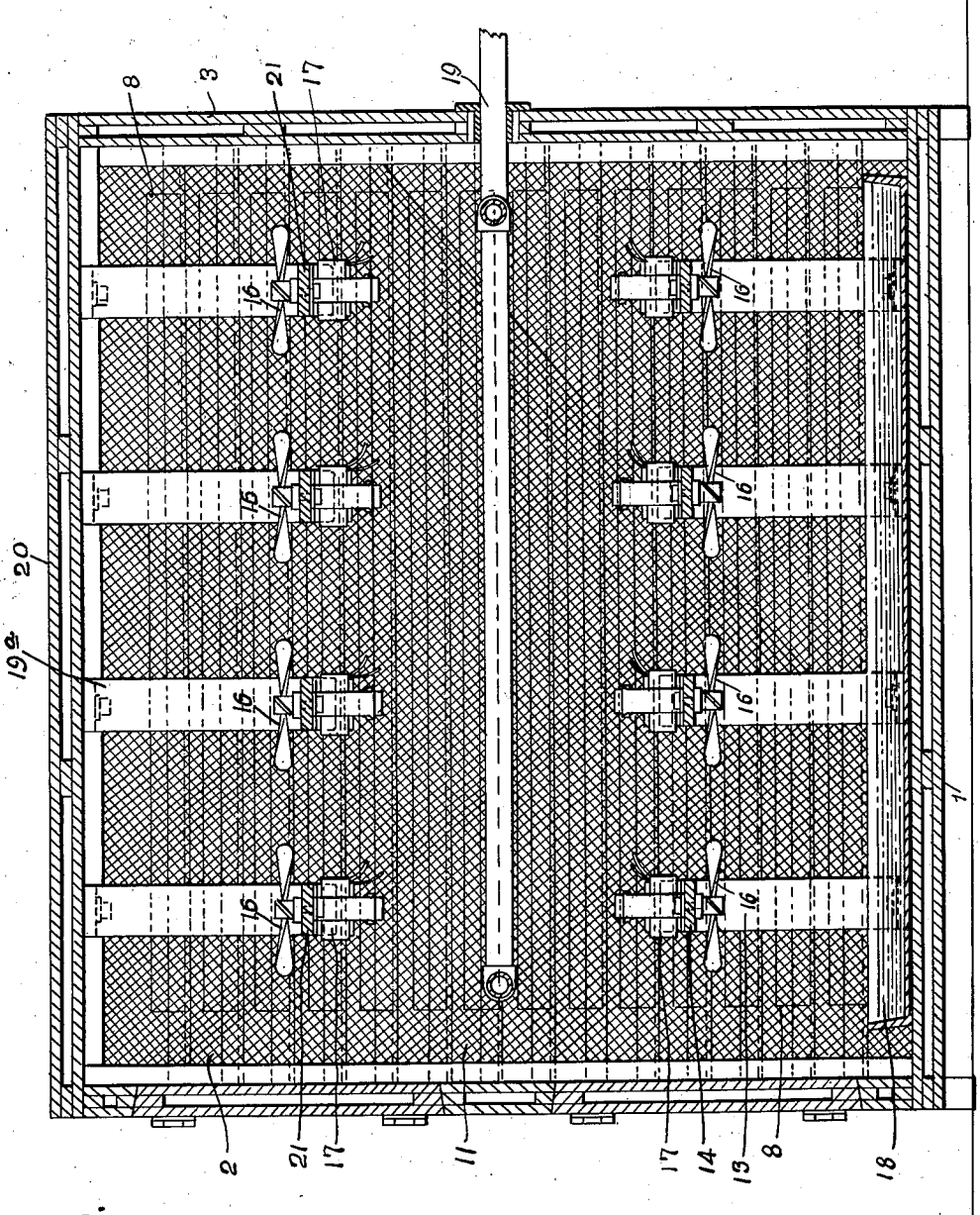
Figure 2 is a section on the line 2—2 of Figure 1.
Figure 3:
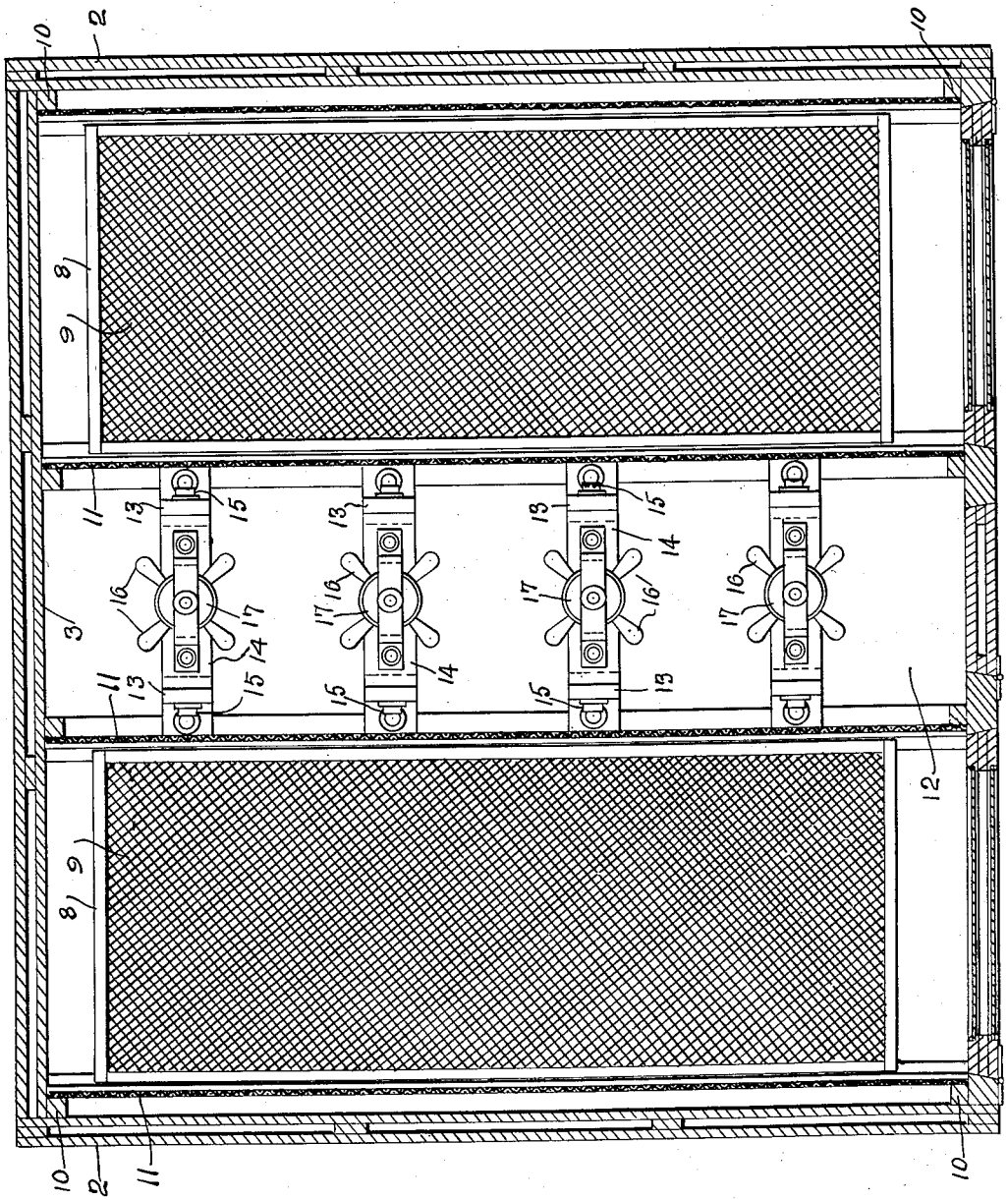
Figure 3 is a section on the line 3—3 of Figure 1.

Referring to the drawings in detail, 1 is the bottom of a cabinet having side walls 2 and a rear wall 3. This cabinet is provided with air inlet openings 4 at the bottom controlled by the doors 5, and air exit openings 6 controlled by the doors 7, both of which are located at the top.

Within the cabinet itself are arranged a plurality of open stacks of trays 8 having perforated bottoms 9. These trays are mounted upon standards 10 at the four corners thereof. The sides and backs of the groups of trays are inclosed with wire netting 11.

Between the stacks of trays is an open space or corridor 12. In this corridor there are supported from the bottom on a plurality of standards 13 a number of independent frames 14 which are adjustably attached to the standards 13 by the set screws 15. These frames 14 carry stirrers or fans, as may be desired, designated 16. Such stirrers or fans are driven by the electric motor or motors 17.

The fans are so arranged in the lower tier along the under series as to drive the air continuously over the moisture pans 18 on the floor of the cabinet, whence the air mushrooms from side to side in irregular movements as there are no walls to guide the movement of the air, and then returns through the eye of the fan for recirculation for passing over the heating pipes 19. Thus the air is churned in the bottom of the cabinet and is laden with moisture. The eggs in the bottom of the cabinet, in the bottom trays, are those primarily in advanced stages of incubation. Consequently they need more moisture than those in the earlier stages of incubation, which are located in the top of the cabinet in the top trays.

Depending standards 19 are carried from the roof 20 of the cabinet. On these standards are a plurality of frames 21 adjustably positioned on the standards 19 by the set screws 15. Similar fans or stirrers 16 are carried in these frames, except that the fans or stirrers are arranged to direct the air in such a manner as to draw it away from the heaters 19 and direct it towards the top of the cabinet, allowing the air to circulate in irregular movements throughout the top of the cabinet. Thus both sets of stirrers or fans draw the air over the heating pipes 19 and discharge the heated air upwardly and downwardly respectively.

I desire to comprehend within my invention such modifications as may be clearly embraced within my claims and the scope of my invention.

Having thus fully described my invention, what I claim is new and desire to secure by Letters Patent, is:

1. In an incubator a cabinet having spaced stacks of egg trays, an air moving means located therebetween in the upper part of the cabinet, an air moving means located therebetween in the lower part of the cabinet, heating means cooperating with the air moving means to provide a current of warm air, said upper air moving means being positioned to direct the air upwardly and said lower air moving means being positioned to direct the air downwardly, and moisture means associated with one of said air moving means, said heating means being located between said air moving means.

2. In an incubator spaced stacks of trays, a fan suspended from the ceiling of the incubator between the trays adapted to direct air upwardly, a second fan suspended above the bottom of the incubator adapted to direct air downwardly, and heating pipes located intermediate of said fans.

3. In an incubator spaced stacks of trays, a fan suspended from the ceiling of the incubator between the trays adapted to direct air upwardly, a second fan suspended above the bottom of the incubator adapted to direct air downwardly, heating pipes located intermediate of said fans, and means to adjustably position the distance of said fans from one another and from the respective top and bottom of said incubator.

4. In an incubator a cabinet without partitions, spaced stacks of egg trays open for the movements of the air, a series of fans positioned between said trays adapted to direct air upwardly, said fans being spaced from the ceiling of the incubator, a second series of fans arranged between the trays adapted to direct air downwardly towards the bottom of the incubator, and a plurality of heating pipes interposed between said fans extending throughout the length thereof.

5. In an incubator a cabinet without partitions, spaced stacks of egg trays open for the movements of the air, a series of fans positioned between said trays adapted to direct air upwardly, said fans being spaced from the ceiling of the incubator, a second series of fans arranged between the trays adapted to direct air downwardly towards the bottom of the incubator, a plurality of heating pipes interposed between said fans extending throughout the length thereof, and moisture pans beneath the lower set of fans arranged in the path of the downwardly directed air.

6. In a method of incubation arranging a plurality of eggs in a stack, supplying heat midway of said stack, moving air over said heating means and delivering it downwardly against the bottom of said incubator, moving air over said heating means and delivering it upwardly against the bottom of the top of said incubator, whereby said air is caused to move irregularly to either side amongst the eggs so stacked.

In testimony whereof I affix my signature.

WHITNEY E. BUNDY.